US009980352B2

(12) United States Patent
Davis et al.

(10) Patent No.: US 9,980,352 B2
(45) Date of Patent: *May 22, 2018

(54) WIRELESS LIGHT PAIRING, DIMMING AND CONTROL

(71) Applicant: Kortek Industries Pty Ltd, Brisbane (AU)

(72) Inventors: Barrie Davis, Sanctuary Cove (AU); Benjamin Davis, Alderley (AU)

(73) Assignee: Kortek Industries Pty Ltd, Brisbane, Queensland ( * ) Notice: Subject to any disclaimer, the term of this patent is extended or adjusted under 35 U.S.C. 154(b) by 0 days. days.

This patent is subject to a terminal disclaimer.

(21) Appl. No.: 14/774,131

(22) PCT Filed: Mar. 14, 2014

(86) PCT No.: PCT/AU2014/000283
§ 371 (c)(1),
(2) Date: Sep. 10, 2015

(87) PCT Pub. No.: WO2014/138822
PCT Pub. Date: Sep. 18, 2014

(65) Prior Publication Data
US 2016/0037615 A1 Feb. 4, 2016

Related U.S. Application Data

(60) Provisional application No. 61/786,519, filed on Mar. 15, 2013.

(51) Int. Cl.
*H05B 37/02* (2006.01)
*H05B 35/00* (2006.01)
(Continued)

(52) U.S. Cl.
CPC .... *H05B 37/0272* (2013.01); *H04M 1/72533* (2013.01); *H04W 4/008* (2013.01);
(Continued)

(58) Field of Classification Search
CPC ........... H05B 37/0272; H05B 37/0227; H05B 37/0281; H05B 33/0842; H05B 37/02;
(Continued)

(56) References Cited

U.S. PATENT DOCUMENTS 5,909,183 A 6/1999 Borgstahl et al.
6,585,596 B1 7/2003 Leifer et al.
(Continued)

FOREIGN PATENT DOCUMENTS

WO 2005084339 9/2005
WO 2012090142 A2 7/2012
(Continued)

OTHER PUBLICATIONS

"Mixed-Mode WLAN: Integration of Ad Hoc Mode with Wireless LAN infrastructure" IEEE GLOBECOM 2003, pp. 231-235, Chen et al.

*Primary Examiner* — Alexander H Taningco
*Assistant Examiner* — Renan Luque
(74) *Attorney, Agent, or Firm* — Eager & Martin Pty Ltd (57) ABSTRACT

A system (100) and method for controlling a light in a residential or commercial location through a wireless communications link with a personal controller (10). The system includes a lighting module (300) and a system administrator (200) having a wireless communications module (202) operable for wireless communication with the personal controller and with the lighting module. The wireless communications module is configured to communicate with the personal controller using a peer-to-peer communications link, and
(Continued)

configured to communicate with the lighting module using a communications link other than peer-to-peer.

22 Claims, 3 Drawing Sheets

(51) Int. Cl.
| | | |
|---|---|---|
| *H04W 4/00* | (2018.01) | |
| *H04M 1/725* | (2006.01) | |
| *H04W 76/02* | (2009.01) | |
| *H04W 84/18* | (2009.01) | |
| *H04W 84/12* | (2009.01) | |

(52) U.S. Cl.
CPC .......... *H04W 76/023* (2013.01); *H05B 35/00* (2013.01); *H04W 84/12* (2013.01); *H04W 84/18* (2013.01)

(58) Field of Classification Search
CPC ............ H05B 37/0218; H05B 37/0254; H05B 37/0245; H05B 33/0803; H05B 33/0854; H05B 37/029; H05B 33/0809; H05B 33/0845; H05B 33/089; H05B 33/0896; H05B 35/00; H05B 37/0263; H05B 37/034; H05B 41/36; G06F 1/26; G06F 1/32; G06F 1/3212; G08C 17/02; G08C 2201/93; G08C 2201/40; G08C 17/00; G08C 2201/42; G08C 2201/50; G08C 2201/51; G08C 23/00; H04W 72/00; H04W 84/12; H04W 88/08; G05B 13/02; G05B 15/02; G05B 19/4185; G05B 2219/23297; G05B 2219/25022; H01H 2300/03; H02J 2003/143; H04L 12/2803; H04L 12/2807; H04L 12/2816; H04L 12/282; H04L 12/2823; H04L 12/2829; H04L 12/283; H04L 12/2836; H04L 12/66; H04M 1/72533; Y02B 20/42; Y02B 20/46; Y02B 60/50
USPC ..... 315/290–295, 286, 22, 289, 296, 297, 3; 700/291, 152, 312, 149, 153, 158, 160, 700/287, 294, 307, 309, 315, 51
See application file for complete search history.

(56) References Cited

U.S. PATENT DOCUMENTS

| | | |
|---|---|---|
| 7,024,501 B1 | 4/2006 | Wright |
| 7,964,989 B1 | 6/2011 | Puschnigg |
| 8,290,515 B2 | 10/2012 | Staton |
| 9,013,059 B2 | 4/2015 | Altonen et al. |
| 2005/0096753 A1 | 5/2005 | Arling et al. |
| 2005/0174962 A1 | 8/2005 | Gurevich et al. |
| 2005/0219208 A1 | 10/2005 | Eichenberger et al. |
| 2006/0028997 A1 | 2/2006 | McFarland |
| 2007/0263600 A1 | 11/2007 | Sutardja et al. |
| 2007/0290793 A1 | 12/2007 | Tran |
| 2007/0293208 A1 | 12/2007 | Loh et al. |
| 2008/0143493 A1 | 6/2008 | Nam et al. |
| 2008/0218148 A1 | 9/2008 | Robertson et al. |
| 2009/0058635 A1 | 3/2009 | LaLonde et al. |
| 2009/0316671 A1 | 12/2009 | Rolf et al. |
| 2010/0031295 A1 | 2/2010 | Krzyzanowski |
| 2010/0271178 A1 | 10/2010 | Ahmad |
| 2010/0271802 A1 | 10/2010 | Recker et al. |
| 2010/0297941 A1 | 11/2010 | Doan et al. |
| 2011/0026504 A1 | 2/2011 | Feinberg |
| 2011/0050451 A1 | 3/2011 | Mierta |
| 2011/0065458 A1 | 3/2011 | Staton et al. |
| 2011/0173313 A1 | 7/2011 | Owhadi et al. |
| 2011/0202194 A1 | 8/2011 | Kobraei et al. |
| 2011/0202910 A1* | 8/2011 | Venkatakrishnan ... G06Q 50/06 717/171 |
| 2011/0225305 A1 | 9/2011 | Vendantham et al. |
| 2011/0243151 A1 | 10/2011 | Diab et al. |
| 2011/0311052 A1 | 12/2011 | Myers et al. |
| 2012/0086560 A1* | 4/2012 | Ilyes ................... H05B 37/0227 340/12.5 |
| 2012/0242526 A1 | 9/2012 | Perez et al. |
| 2013/0083805 A1 | 4/2013 | Lu et al. |
| 2013/0085620 A1* | 4/2013 | Lu ....................... H04L 12/2807 700/286 |
| 2013/0142181 A1 | 6/2013 | Makim et al. |
| 2013/0289983 A1* | 10/2013 | Park ....................... G10L 15/26 704/235 |
| 2014/0191573 A1 | 7/2014 | Chen et al. |
| 2014/0244044 A1 | 8/2014 | Davis et al. |
| 2014/0244045 A1 | 8/2014 | Davis et al. |
| 2014/0244063 A1 | 8/2014 | Davis et al. |
| 2014/0277292 A1* | 9/2014 | Steel .................... A61N 5/0622 607/88 |
| 2015/0056979 A1 | 2/2015 | Davis et al. |
| 2015/0287041 A1 | 10/2015 | Davis et al. |
| 2015/0327304 A1* | 11/2015 | Tinnakornsrisuphap H04L 41/0809 709/227 |

FOREIGN PATENT DOCUMENTS

| | | |
|---|---|---|
| WO | 2012109696 A1 | 8/2012 |
| WO | 2013034361 A1 | 3/2013 |

* cited by examiner

WIRELESS LIGHT PAIRING, DIMMING AND CONTROL

FIELD OF THE INVENTION

The present invention relates to a system and method for authoring and wirelessly controlling lights in domestic and commercial applications using a standard smartphone, tablet or similar item to act as a personal controller through a wireless peer-to-peer communications link and/or a wireless local area network.

BACKGROUND OF INVENTION

Lighting is a common part of domestic and commercial buildings. Some structures have complex lighting automation systems that support the programming of parameters such as scheduling, dimming and color mixing. These typically operate through a number of wireless and hardwired technologies that use open or proprietary protocols through a combination of buttons, switches or remote controllers. While it is relatively easy to specify a lighting automation system during a building's construction, legacy systems are typically expensive; involve considerable additional wiring; and may not be compatible with emerging Light Emitting Diode (LED) luminaries. Conversely, a structure may be built with an absolute bare minimum of lighting control using standard hardwired light switches and nothing else. In this instance, the ability to introduce any additional form of lighting control or automation can be severely limited by the building construction and infrastructure making it impossible or expensive to add any new capabilities.

In recent years, the proliferation of smartphones has placed powerful computing devices in the hands of the public. While these devices can generate and transmit wireless control commands, their generic wireless systems are not compatible with the standards currently used in domestic or commercial lighting, so they cannot natively communicate with such in order to exchange commands.

SUMMARY

In one preferred embodiment, the present invention includes three parts: a system administrator with a power interface connection; a lighting module adapted to vary the power supplied to a luminaire and wirelessly exchange commands with a system administrator; and a battery powered personal controller able to wirelessly communicate with a system administrator.

The system administrator is preferably configured to operate: as an adaptable Wi-Fi Direct access point/group participant and network Wi-Fi device, either individually or concurrently, using Wi-Fi-Direct and/or network Wi-Fi technologies; as a Zigbee mesh device using Zigbee technologies; and optionally as a Bluetooth device using Bluetooth SIG class 2.1+EDR or later technologies. As used herein, "network Wi-Fi" refers to the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and amendments, extensions or proprietary implementations of Wi-Fi peer-to-peer technology. As used herein, "Zigbee" refers to the Zigbee Alliance Zigbee specifications and standards, Zigbee RF4CE specifications and standards, Zigbee 2012 specifications and standards, and IEEE 802.15.4 specifications and standards, including any amendments, extensions or proprietary implementations.

The system administrator preferably includes a physical power connector designed to accommodate a lighting module and supply the necessary power for the lighting module to run its wireless and control systems.

Wi-Fi Direct and Bluetooth are peer-to-peer communication technologies. Peer-to-peer communication methods that may be incorporated into the system administrator are described in more detail in PCT Application No. PCT/AU2011/001666, filed Dec. 29, 2011, titled "Wireless Power, Light and Automation Control," the entire disclosure of which is incorporated herein by reference. Network Wi-Fi is a communication technology that allows devices to communicate through a WLAN. Adaptable network, peer-to-peer communication methods and system attributes that may be incorporated into the system administrator are described in more detail in PCT Application No. PCT/AU2012/000959, filed Aug. 15, 2012, titled "Adaptable Wireless Power, Light and Automation System" the entire disclosure of which is incorporated herein by reference.

The personal controller is preferably a commercially available cellular or mobile phone commonly known as a smartphone that supports at least network Wi-Fi and may also support Wi-Fi Direct and/or Bluetooth and/or Near Field Communications (NFC). Unless otherwise noted, the personal controller will be described in terms of a smartphone, though the invention is not so limited. For example only, the personal controller may be any portable device which can download or install by other means an Applications Program (App), have a suitable interface the user can interact with to control the App in order to execute required functions, and have the wireless communications capability to establish communications with a system administrator. Examples of personal controllers include smartphones, tablets, laptops, ultrabooks and notebook personal computers.

The lighting module is preferably a small device configured to accept mains power, or low voltage power from a ballast, for the purpose of varying the power supplied to an attached lamp or luminaire. The lighting module preferably utilizes a wireless mesh communications standard capable of forming a mesh network with other lighting modules for the purpose of exchanging and executing commands from a system administrator. The lighting module preferably includes dimming capabilities.

The system administrator can preferably form a communications link with a smartphone using Wi-Fi Direct and/or network Wi-Fi. It can be appreciated that when the system administrator is connected to a WLAN, any smartphone with Wi-Fi capability also connected to the same WLAN can use an appropriate App to communicate with the system administrator. That is, a user can enter a command into their smartphone and send it to the system administrator via the WLAN. In this case the smartphone could be in the vicinity of the WLAN access point, or the smartphone could be at a remote location and communicate with the WLAN access point via the Internet if so configured.

It can be appreciated that a system administrator operating as a Wi-Fi Direct access point/group participant can communicate directly with a smartphone without the requirement of a WLAN. In this case, the system administrator appears as a Wi-Fi access point or SoftAP if the smartphone is not using Wi-Fi Direct to communicate; or if the smartphone is using Wi-Fi Direct to communicate, the system administrator and smartphone can negotiate which assumes the Wi-Fi Direct group owner role and establish a peer-to-peer connection. Once a peer-to-peer connection has been established, the user is able to send commands directly from a smartphone to the selected system administrator without the need for any other intermediary or network.

The present invention in one preferred embodiment provides a system administrator with wireless communication capabilities derived from any number of radios, transceivers and controllers that provide both a network Wi-Fi and Wi-Fi Direct connection individually or concurrently and a Zigbee connection. In some preferred embodiments the system administrator may also support a Bluetooth connection. In some preferred embodiments the system administrator may use Z-wave or an alternate wireless mesh network communications protocol other than Zigbee.

Depending on cost and desired outcome, the wireless communication capabilities of the system administrator may be achieved by using: any number of discrete radios, aerials, transceivers and controllers either individually, collectively, or as a system in a package (SiP) or as a system on a chip (SoC); a combination or "combo" chip that aggregates the functionality of a number of discrete transceivers and controllers of different standards as a SiP or SoC; or using a combination of combo chip/s, SiP/s, SoC/s and/or discrete radios, aerials, transceivers and controllers. The system administrator may utilize single or multiple wireless bands, physical channels, virtual channels, modes or other coexistence technologies and algorithms, the methods of which are already known to those of ordinary skill in the art and are not described herein. Depending on the chosen hardware components, the system administrator may also include shared antenna support and shared signal receiving paths to eliminate the need for an external splitter.

The present invention in one preferred embodiment provides a system administrator with wireless communications that in a first mode provides a Wi-Fi Direct peer-to-peer connection and in a second mode can be configured by the user to operate as a network Wi-Fi device and connect to a WLAN as a client.

The system administrator preferably has its wireless communications set to initially function in Wi-Fi Direct access point/group participant mode irrespective of its final configuration. Because the Wi-Fi Direct access point/group participant mode is a peer-to-peer connection, as soon as power is applied to the system administrator, it can be recognised by a smartphone and a wireless communications link can be established. Once the link is established, the user is able to activate a smartphone App which uses the data path between the smartphone and system administrator. Using a smartphone App, the user can set the operational parameters required for a network Wi-Fi or Wi-Fi Direct device, name the device, set an encryption key, enter a password and any other requirements. When this procedure has been completed, the user can command the system administrator to "restart", at which time it will configure itself according to the parameters which have been specified during the setup process.

If the user has chosen the system administrator to operate as a Wi-Fi Direct device, it would continue to do so after the restart. The system administrator would only connect to smartphones that can fully comply with its connection requirements before establishing a communications link. This may include security measures in addition to any native security measures of Wi-Fi Direct such as Wi-Fi Protected Access.

If the user has chosen the system administrator to operate as a network Wi-Fi device, the smartphone App would configure the necessary parameters for the system administrator to connect to a WLAN. When the system administrator restarts, it would connect as a client device on the WLAN. It would only be accessible to devices which are also connected to the same WLAN.

In either mode, a smartphone App is preferably used control the functional capabilities of the system administrator. In network Wi-Fi mode, the smartphone App communicates with the selected system administrator via a WLAN access point. In Wi-Fi Direct mode, the smartphone App communicates directly with the selected system administrator peer-to-peer.

If the user has chosen the system administrator to operate as both a Wi-Fi Direct device and network Wi-Fi device concurrently, when the system administrator restarts it would appear as a client device on the WLAN and as a Wi-Fi Direct access point/group participant. In that way a system administrator could allow third parties to control functions via a Wi-Fi Direct connection without allowing access to the concurrent WLAN connection, thus preventing access to other WLAN devices.

In one preferred embodiment, a Bluetooth peer-to-peer connection between a smartphone and system administrator may be used to enter information for configuration of the system administrator as a network Wi-Fi device and/or Wi-Fi Direct access point/group participant. In another preferred embodiment, a Bluetooth peer-to-peer connection may be used to enter information for configuring the system administrator, and sending control commands to the system administrator.

The present invention in one preferred aspect provides a system for controlling the power supplied to luminaries in a domestic or commercial setting via lighting modules that can be wirelessly controlled by a standard smartphone, tablet or similar item acting as personal controller communicating through a wireless peer-to-peer communications link and/or a wireless local area network connection with a system administrator.

DETAILED DESCRIPTION OF THE DRAWINGS

Alternative embodiments of the invention will be apparent to those of ordinary skill in the art from consideration of the specification and practice of the invention disclosed herein. It is intended that the specification and examples be considered as exemplary only, with a true scope and spirit of the invention being indicated by the claims which follow.

Referring to FIGS. 1 to 4, system 100 preferably includes an applications program, hereby termed a "Product App," a personal controller 10, a system administrator 200, and one or more lighting modules 300. Preferably, the Product App is downloaded to smart phone 10 and configures and/or commands system administrator 200 to operate and control one or more lighting modules 300. Each lighting module 300 is preferably adapted to vary power to an associated light, lamp and/or luminary. System 100 preferably utilises a wireless communications network in order to convey commands and control power use. The communications between system administrator 200 and smart phone 10 preferably utilises either a network WLAN, a peer-to-peer connection, or both concurrently. The communications network between system administrator 200 and one or more of lighting modules 300 is preferably configured as a mesh network utilising low powered radios, preferably configured for use with the Zigbee specification. The interaction of the Product App, smart phone 10, system administrator 200 and lighting modules 300 will be described in further detail below.

By way of example, where system administrator 200 operates a network WLAN and peer-to-peer connection concurrently, system administrator 200 may allow third parties to control functions via the peer-to-peer connection without allowing access to the concurrent WLAN connection, thus preventing access to other WLAN devices. Alternately, system administrator may allow remote monitoring of the system via the network WLAN connection while limiting actual control of the system to the peer-to-peer connection.

Figure 1:
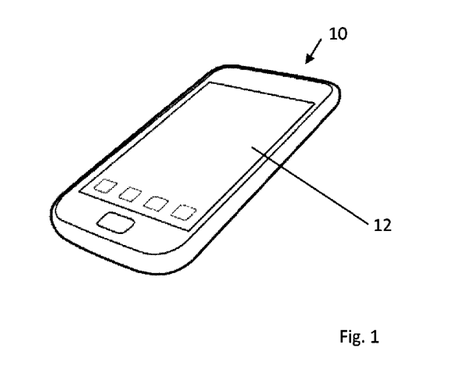
FIG. 1 is a perspective view of a smartphone in accordance with one preferred embodiment of the present invention.

FIG. 1 is a perspective representation of a smartphone 10 which uses a wireless link to communicate with a system administrator, described in further detail below. Smartphone 10 is preferably a commercially available, conventional smartphone. Some of the basic functions the smartphone preferably includes are: a touch sensitive graphical screen interface 12; a compatible radio transceiver; and the ability to run an App specific to the individual smartphone that provides a control interface for the system administrator. In the examples that follow, specific coding for each App has been omitted for simplicity as a person of ordinary skill in the art would be able to understand and reproduce the functionality of the described embodiments without the need for discussion on particular coding.

Smartphone 10 is preferably configured to operate across a range of wireless communications technologies, including the technology to communicate via at least network Wi-Fi. Smartphone 10 may include additional capability for Wi-Fi Direct and/or Bluetooth and/or NFC. While preferred embodiments of the present invention use a smartphone as its controller, and specifically a smartphone incorporating at least network Wi-Fi, other wireless communications methods and systems could be used depending on the specific requirements of the application of the invention.

Figure 2:
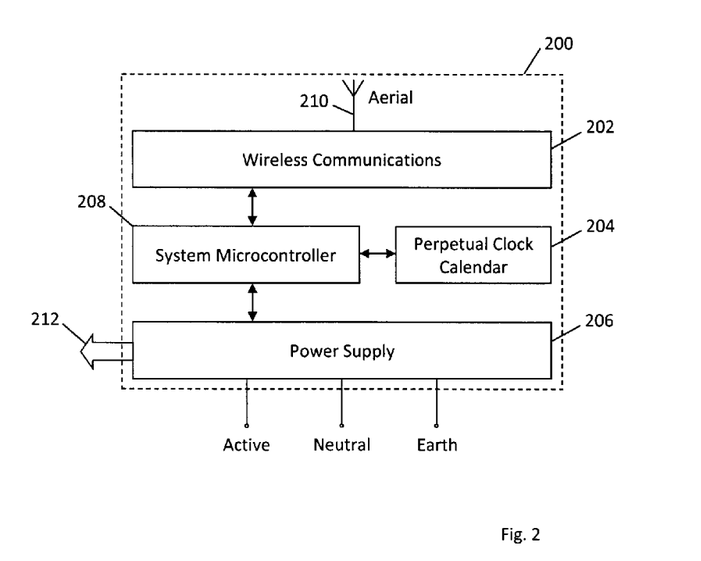
FIG. 2 is a block diagram of the functional elements of a system administrator.

Referring now to FIG. 2, a system administrator 200 is shown in accordance with a preferred embodiment of the present invention. System administrator 200 is a physical device that preferably includes wireless communications 202, perpetual clock calendar 204, power supply 206, system microcontroller 208 with an embedded memory, and an aerial 210. Wireless communications 202 includes the circuitry permitting system administrator to communicate with smart phone 10 and/or other system elements across one or more communications platforms, as will be described in further detail below. In some preferred embodiments, it may be preferable for system microcontroller 208 to support external memory in addition to, or instead of, embedded memory. In some preferred embodiments, system administrator 200 may have more than one aerial depending on the coexistence capabilities of the Wi-Fi and Zigbee elements. Perpetual clock calendar 204 preferably includes a power backup by the way of a battery or supercapacitor enabling real time to be accurately maintained in instances where a mains power outage occurs.

Figure 3:
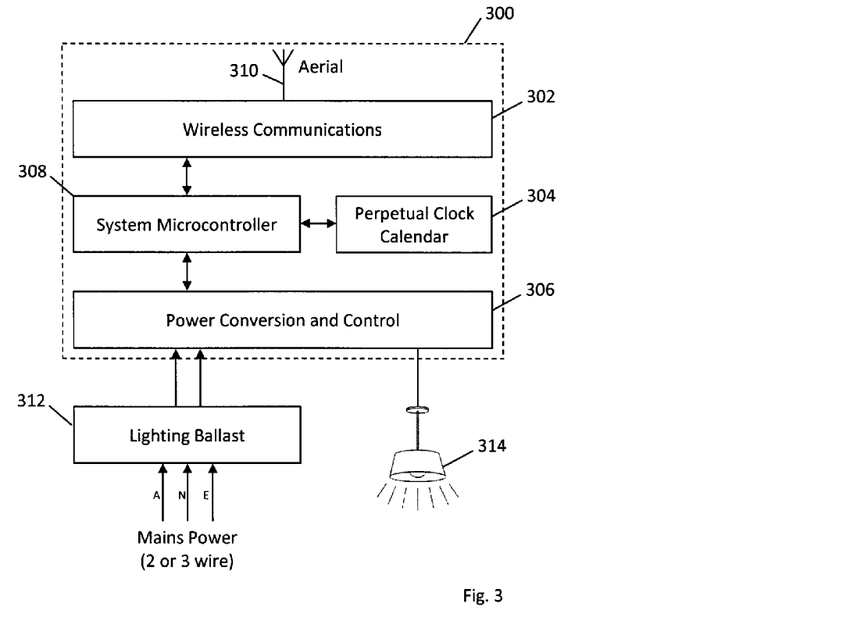
FIG. 3 is a block diagram of the functional elements of a lighting module.

In one preferred embodiment, system administrator 200 preferably offers an integrated power receptacle 212 compatible with the input power jack of lighting module 300, allowing lighting modules to plug into and accept power from system administrator 200 in order to run their respective microprocessor and wireless communications.

In one preferred embodiment, system administrator 200 is preferably configured to plug into a mains power general purpose outlet. In another preferred embodiment, system administrator 200 may preferably be wired into part of a building or structure. If desired, system administrator 200 may be built into, or form part of, a light switch.

The commands and responses between system microcontroller 208 and smartphone 10 are communicated through a radio frequency wireless link supported by wireless communications 202 and aerial 210. The commands and responses between system microcontroller 208 and lighting module 300 are communicated through a radio frequency wireless link also supported by wireless communications 202 and aerial 210. The communication standards utilised between smart phone 10 and system administer 200 (e.g., WLAN and/or peer-to-peer) may be different from the communications standards used within the mesh network (e.g., Zigbee). This may be as a result of optimising the system based on security parameters and/or power consumption factors. Thus, wireless communications 202 of system administrator 200 preferably functions as a bridge to reformat instructions sent by the Product App for dispersal among one or more lighting modules 300. In order to facilitate its bridging function, an additional aerial may be included with communications capabilities separated between aerials based on Wi-Fi and Zigbee standards as desired. It can be appreciated that separate aerials may be required where the Wi-Fi and Zigbee standards operate on different carrier frequencies, for example 2.4 gHz and 5 gHz. Wireless communications 202 preferably includes any number of radios, transceivers, controllers and aerials that provide a network Wi-Fi and Wi-Fi Direct connection individually or concurrently, a Zigbee mesh connection, and the ability to optionally support Bluetooth and/or NFC. The wireless communication capabilities may be achieved by using: any number of discrete radios, aerials, transceivers and controllers either individually, collectively, or as a SiP or SoC; a combination or "combo" chip that aggregates the functionality of a number of discrete transceivers and controllers of different standards as a SiP or SoC; or using a combination of combo chip/s, SiP/s, SoC/s and/or discrete radios, aerials, transceivers and controllers. Depending on the chosen hardware components, the system administrator may include: coexistence algorithms; shared antenna support; and shared signal receiving paths to eliminate the need for an external splitter. Smartphone 10 may communicate with any mix of wireless elements and radio technologies to seamlessly provide the best communications link.

When wireless communications 202 operates according to the Wi-Fi Direct specification, it can communicate with devices that support network Wi-Fi or Wi-Fi Direct on a peer-to-peer basis without the need for any intermediary hardware. Wireless communications 202 is preferably configured to operate according to the Wi-Fi Direct specification as both a Wi-Fi Direct group participant and Wi-Fi Direct access point or SoftAP, allowing the system administrator to appear to network Wi-Fi devices during discovery as a Wi-Fi access point. After being discovered as a Wi-Fi Direct access point, a Wi-Fi Direct device is able to communicate peer-to-peer with network Wi-Fi devices that support the IEEE 802.11 specification as amended from time to time. In this instance, a network Wi-Fi device will receive a device discovery message from the system administrator as if from a Wi-Fi access point and be able to establish a communications link with a smartphone if the right is granted by the system administrator. The procedure of establishing a communications link between a Wi-Fi Direct device and network Wi-Fi devices are defined in the Wi-Fi Alliance specifications and would be understood by practitioners of ordinary skill in communications systems protocols.

Wi-Fi Direct has a number of advantages which simplify communications between a system administrator and a smartphone operating as a controller. Significant advantages include mobility and portability, where a smartphone and the system administrator only need to be within radio range of each other to establish a wireless communications link. Wi-Fi Direct offers secure communications using Wi-Fi Protected Access protocols and encryption for transported messages, ensuring the system remains secure to qualified devices. Most importantly, Wi-Fi Direct allows a smartphone with only network Wi-Fi to engage in peer-to-peer data exchange with a system administrator even though the smartphone network Wi-Fi was never intended to support on-demand, peer-to-peer communications.

As smartphones continue to evolve, new models are starting to include Wi-Fi Direct support in addition to network Wi-Fi. In one preferred embodiment, where a system administrator receives a Wi-Fi Direct response to a device discovery message, the smartphone and system administrator will negotiate which device will be the group owner in accordance with the Wi-Fi Alliance Wi-Fi Direct specification, and a 1:1 or peer-to-peer Wi-Fi Direct communication link will be established. The Wi-Fi Direct specification allows any Wi-Fi Direct device to be a group owner, and depending on the capabilities of the device, the negotiation procedure determines the most suitable device to perform this role.

System microcontroller 208 preferably incorporates a firmware program which defines the operation and functions of the system administrator and assumes responsibility for controlling all program code and system elements, including specifying the operational modes of wireless communications 202, interrogation of the perpetual clock calendar 204, and exchange of data and control messages to a lighting module and smartphone via wireless communications 202. System microcontroller 208 preferably includes non-volatile memory to store any program data received from the Product App. In some preferred embodiments, perpetual clock calendar 204 may be an embedded function of system microcontroller 208. In some preferred embodiments, the non-volatile memory may be external to system microcontroller 208. In some preferred embodiments, more than one microcontroller may be used.

When system administrator 200 is manufactured, system microcontroller 208 preferably holds the firmware to operate system administrator 200 as a network Wi-Fi device and Wi-Fi Direct access point/group participant. When power is applied to system administrator 200 for the first time, system microcontroller 208 preferably starts system administrator 200 in Wi-Fi Direct access point/group participant mode and begins transmitting discovery messages or "pings" that can be detected by a smartphone within wireless range.

It can be appreciated that a system administrator operating as a Wi-Fi Direct access point/group participant can communicate directly with a smartphone without needing a Wi-Fi WLAN. System administrator 200 preferably either appears as a Wi-Fi access point if smartphone 10 is not using Wi-Fi Direct; or negotiates with smartphone 10 as to which device will assume a Wi-Fi Direct group owner role if smartphone 10 supports Wi-Fi Direct. The user is then able to establish a peer-to-peer communications link and send commands directly to the selected system administrator without the need for any other device.

A preferred method for controlling a system administrator is through a related Product App. Installation instructions for the Product App are preferably included with the system administrator. The Product App preferably adopts the same centralized app store installation methods commonly utilised by conventional smartphone platforms.

In one preferred embodiment, the Product App may preferably control smartphone 10 wireless communications in order to initiate, search and establish a wireless communications link with system administrator 200.

When the Product App starts, it will preferably scan for system administrators and identify any new system administrator that needs to be initially configured. At this point the Product App preferably allows the user to establish a peer-to-peer connection with a new system administrator and determine if it is: to remain a Wi-Fi Direct access point/group participant only; connect to a WLAN as a client and become a network Wi-Fi device; or, where supported by system administrator wireless communications 202, operate simultaneously as a Wi-Fi Direct access point/group participant and network Wi-Fi device.

If the user wants the new system administrator to be a Wi-Fi Direct device, they preferably select this option in the Product App. The Product App then leads the user through a series of data inputs using the smartphone's touch screen 12 as a human interface. The Product App communicates with system microcontroller 208 and replaces the general parameters used for the initial connection to specific parameters which define the system administrator as a unique Wi-Fi Direct product. These may include: setting a unique encryption key so all data transfers between the system administrator and the smartphone are protected; setting the system administrator name to a unique, easily recognisable identifier, e.g., from a product name such as "Wireless Controller" to "Kitchen Lights"; setting the system administrator's unique Wi-Fi address ID so that it becomes an individual device in its own right; and setting a password in the system administrator used to establish a secure link with a smartphone.

The Product App preferably maintains a record of these specific parameters in the smartphone memory for future identification of, and connection to, the new system administrator.

Once the setup procedure is complete, the Product App preferably commands the system administrator firmware to "restart". When the applications firmware restarts, the system administrator will use the user loaded data to populate and create its own unique Wi-Fi Direct identity. The smartphone which was used to set this identity will be able to automatically connect to that system administrator because the new specific parameters are known. The Product App can then be used to preferably automatically establish a communications link with the system administrator each time the user selects that particular device.

Once a system administrator has been configured, any other smartphone can only connect if the user knows the specific parameters that are now unique to that particular system administrator. If a second smartphone searches for Wi-Fi access points or Wi-Fi Direct devices, it will see the system administrator identified as, for example, "Kitchen Lights" with the characteristic that it is "secure". To connect to it, the user will have to know the specific password allocated to that system administrator, otherwise it will not be able to establish a communications link. If the password is known and entered into the smartphone when requested, a communication link between the second smartphone and the system administrator will be established. The Product App is still preferably required to control the system administrator and this may have additional security requirements depending on the nature of the application.

If, instead of configuring the newly installed system administrator as a Wi-Fi Direct access point/group participant, the user chooses it to be a network Wi-Fi device, this is selected as the required option and the Product App determines if there are one or more WLANs available for the system administrator to connect to as a client. The Product App requests the user to confirm the preferred network and asks the user to confirm and/or input any necessary network parameters such as the network password so the system administrator can connect to the WLAN as a client.

The Product App, via the smartphone, communicates with system microcontroller 208 and sets the parameters needed for the system administrator to establish itself as a network Wi-Fi device. When all of the appropriate parameters are known and updated, the Product App commands the system administrator to restart its firmware as a network Wi-Fi device. The system administrator then connects to the WLAN as a client and is only accessible by the smartphone Product App via the WLAN access point. The system administrator running as a network Wi-Fi client can then be controlled by other smartphones as long as they are on the same WLAN. In one preferred embodiment, it may be desirable for the system administrator to include additional security measures such as password protection, a socket layer with the Product App, or other measures to prevent the system administrator being controlled by other devices on the network without authorization.

Once a system administrator has been configured as a Wi-Fi Direct access point/group participant or a network Wi-Fi device, it preferably continues to operate in that mode even after it has been powered off. All of the specific operating parameters for each mode are preferably saved in the non-volatile memory and are retained if power is removed. When power is restored, system microcontroller 208 powers up the same Wi-Fi mode that was running before power was removed, and the appropriate firmware and operating parameters are restored from non-volatile memory.

There are applications where a system administrator running concurrent Wi-Fi Direct access point/group participant and network Wi-Fi capabilities is desirable. In this situation, the user via the Product App can activate both modes, allowing either mode to be used. Equally, the user, via the Product App, can choose to disable one of the modes, or can change the Wi-Fi mode from Wi-Fi Direct access point/ group participant to network Wi-Fi, or vice versa as desired.

Each time the Wi-Fi mode is changed, the parameters for the new mode are preferably retained by system microcontroller 208 in the event power is disconnected or lost. When power is restored, system microcontroller 208 powers up in the same Wi-Fi mode as previously operating before power was removed, and the appropriate operating parameters are restored from the non-volatile memory. Thus, system microcontroller 208 preferably is configured with an adapted default setting which remembers (stores) the last change.

It is envisaged that there may be times when a system administrator may be moved and the current Wi-Fi mode may not be suitable, or the original WLAN may no longer be available. The Product App is preferably able to communicate with a system administrator and command it to re-initialise to the factory default configuration. In this case, all user-defined parameters that were loaded into the system administrator are lost and it is returned to its factory default state, ready to receive new user-defined parameters.

The system administrator may incorporate a mechanical means such as a button or switches which the user could activate to cause the system administrator to: re-initialise to the factory default configuration without the use of a smartphone or Product App; reboot the system; or assist in a Wi-Fi Protected Setup.

In one preferred embodiment, the system administrator may include Bluetooth communication capabilities in addition to Wi-Fi Direct access point/group participant and network Wi-Fi capabilities. A peer-to-peer Bluetooth communication link between smartphone 10 and system administrator 200 may be used by the Product App to enter parameters for establishing a Wi-Fi Direct access point/ group participant or network Wi-Fi communications link, or may in its own right operate as a peer-to-peer communications link for transfer of control commands between the Product App and system administrator 200.

In one preferred embodiment, the system administrator may include NFC capability that the Product App could use when first communicating with a new system administrator to automatically establish a Wi-Fi Direct access point/group participant peer-to-peer communications link with those smartphones that support NFC. This process is commonly referred to as "bootstrapping" and is an established method for initializing communications known by those of ordinary skill in the art.

It will be appreciated that the steps described above may be performed in a different order, varied, or certain steps added or omitted entirely without departing from the scope of the present invention. It will also be appreciated by those of ordinary skill in the art that the system described above can be varied in many ways without departing from the scope of the present invention. By way of example only, elements of wireless communications 202, system microcontroller 208, perpetual clock calendar 204 and interface connection 206 may be aggregated into a single or various SoCs or SiPs.

FIG. 3 shows the preferred functional elements of lighting module 300. Lighting module 300 preferably includes wireless communications 302, perpetual clock calendar 304, power conversion and control 306, system microcontroller 308 with an embedded memory, and an aerial 310. In some preferred embodiments, it may be preferable for system microcontroller 308 to support external memory in addition to, or instead of, embedded memory. In some preferred embodiments, wireless communications 302 may have more than one aerial. In some preferred embodiments, perpetual clock calendar may be omitted entirely, or form part of system microcontroller 308.

The commands and responses between system microcontroller 308 and system administrator 200 are communicated through a radio frequency wireless link supported by wireless communications 302 and aerial 310 in lighting module 300 and wireless communications 202 and aerial 210 in system administrator 200, although in a preferred embodiment an additional aerial may be included in the system administrator dedicated specifically to communications with a lighting module.

Wireless communications 302 preferably includes any number of radios, transceivers, controllers and aerials that provide a Zigbee mesh communication capability. The wireless communication capabilities may be achieved by using:

any number of discrete radios, aerials, transceivers and controllers either individually, collectively, or as a SiP or SoC. In one preferred embodiment, wireless communications 302 may be configured to support the Zigbee Light Link standard.

Power conversion and control 306 preferably includes a physical input connection allowing external lighting ballast 312 to be connected to lighting module 300. As used herein, the term "ballast" refers to a low voltage power supply commonly used in modern lighting systems, the construction and implementation of which are well established and known by those of ordinary skill in the art. By way of example only, ballast 312 may be used to convert 240 volt mains power to 12 volts in order to run low voltage multifaceted reflector (MR) incandescent or LED lights. In one preferred embodiment, the lighting module input connection may preferably conform to the GU5.3 two-pin standard.

Mains power can be used to run certain luminaries without requiring external ballast. For example, the lighting module input connection may be configured to accept mains power without the use of ballast. The lighting module input connection may configured to conform to the GU10 turn-and-lock standard if desired.

Power conversion and control 306 preferably includes a physical output connection allowing a lamp or luminaire to be connected to, and powered from, lighting module 300. The output connection of lighting module 300 may preferably conform to the GU5.3 bi-pin standard or the GU10 turn-and-lock standard if desired. Lighting module 300 may be designed to power more than one light or luminaire.

Power conversion and control 306 is preferably configured to control power operating lighting module 300 in addition to controlling the power to a lamp/luminaire 314.

The most common mains voltage lamp types are incandescent and fluorescent. Halogen lamps are a form of incandescent and CFL lamps are a form of fluorescent lamp. Incandescent lamp technology is based on heated filaments and can be dimmed by varying the applied voltage, while fluorescent lamp technology is based on a plasma arc and can be dimmed by varying the current flow. A number of dimming techniques are well established for mains voltage incandescent and fluorescent lamps, and would be readily apparent to those of ordinary skill in the art without further detail.

There are also mains powered LED lamps being manufactured as direct replacements for incandescent lamps, and in particular, halogen lamps in the MR16 form factor. These devices include power conversion electronics that ensure the maximum current is not exceeded, allowing them to be a direct replacement for a mains powered halogen lamp.

Lighting module 300 may be used to control the power supplied to a mains voltage lamp without ballast 312. In this environment, lighting module 300 is preferably directly connected between the mains power light switch and lamp/luminaire 314 to be controlled. A user through the Product App running on smartphone 10 can send commands to lighting module 300 via system administrator 200, causing the lamp to be switched on/off or set to an intermediate level, commonly called dimming. To do this, lighting module 300 preferably controls the amount of mains voltage power being applied to the lamp by delaying the start of each voltage half cycle or terminating each voltage half cycle early. Because the power being applied to the lamp is less than the power required for full light output, the amount of light emitted by the lamp is reduced. These control methods are commonly called leading edge and trailing edge dimming. Other requirements and methods to these basic dimming techniques would be understood by those of ordinary skill in the art of lighting control systems and will not be described in detail, however they have the same effect in being able to control the amount of light being emitted by luminaire 314.

The functional characteristics of different mains powered lamp technologies are such that some perform better using leading edge dimming while others perform better using trailing edge diming, or adaptations or variations thereof. For lighting module 300 to perform optimally, the user via the Product App is preferably able to specify the type of lamp connected to lighting module 300. The Product App preferably configures the optimal dimming method for the type of lamp chosen and commands lighting module 300 to use this method when dimming a connected lamp. As the Product App is part of a network formed by smartphone 10, system administrator 200 and lighting module 300, persons of ordinary skill in the art of network and control will understand that the dimming control methods and parameters can be held in the Product App, system administrator 200 and/or in lighting module 300 without departing from the scope of the present invention.

Referring to FIG. 3 again, lighting module 300 may be used to control the power supplied to low voltage lamps, such as low incandescent and LED lamps. When used for low voltage lamps, lighting module 300 is preferably connected between ballast 312 and the lamp/luminaire 314 to be controlled. Lighting module 300 is preferably configured to draw the small amount of power it requires to operate from ballast 312 so that an additional power supply is not required.

The most common low voltage lamp types are halogen and LED. Halogen lamps are a form of incandescent lamp and LEDs are a semiconductor device. Halogen lamp technology is based on heated filaments and can be dimmed by varying the applied voltage while LED lamp technology is based on solid-state semiconductors and can be dimmed by varying current flow through the diode. There are low voltage LED lamps being manufactured as direct replacements for halogen lamps in the MR16 form factor. These devices include power conversion electronics that ensure the maximum current is not exceed allowing them to be a direct replacement for a low voltage powered halogen lamp.

A user through Product App running on smartphone 10 can send commands to lighting module 300 via system administrator 200, causing the lamp to be switched on/off or set to an intermediate level commonly called dimming. To do this, lighting module 300 preferably controls the amount of low voltage power being applied to the lamp by first rectifying and smoothing the input voltage from the ballast to ensure the working voltage is known to be DC. If the lamp in luminaire 314 is a halogen, the average voltage applied across the lamp is varied by pulse width modulation methods which simulate the leading edge dimmer function used for mains power dimming of incandescent lamps while ensuring the maximum voltage rating of the lamp is not exceeded. If the lamp in luminaire 314 is a LED, the average current passing through the lamp is varied by pulse width modulation methods while ensuring the maximum current rating of the lamp is not exceeded. To ensure that both lamp types are protected, extensive monitoring and control of the voltage applied to and current drawn by the luminaire is performed by power conversion and control 306.

If desired, lighting module 300 may be built into, or form part of, a lighting ballast mechanism, or be built into, or form part of, an LED luminaire. If desired, the ballast, lighting module and one or more LED lamps may preferably be built as a single device to form a complete LED luminaire.

If desired, lighting module 300 may be built into, or form part of, a light switch.

It will be appreciated that the physical interconnection methods between a lighting module, ballast and lamp/luminaire may be performed by a range of different plug and receptacle types without departing from the scope of the present invention.

Figure 4:
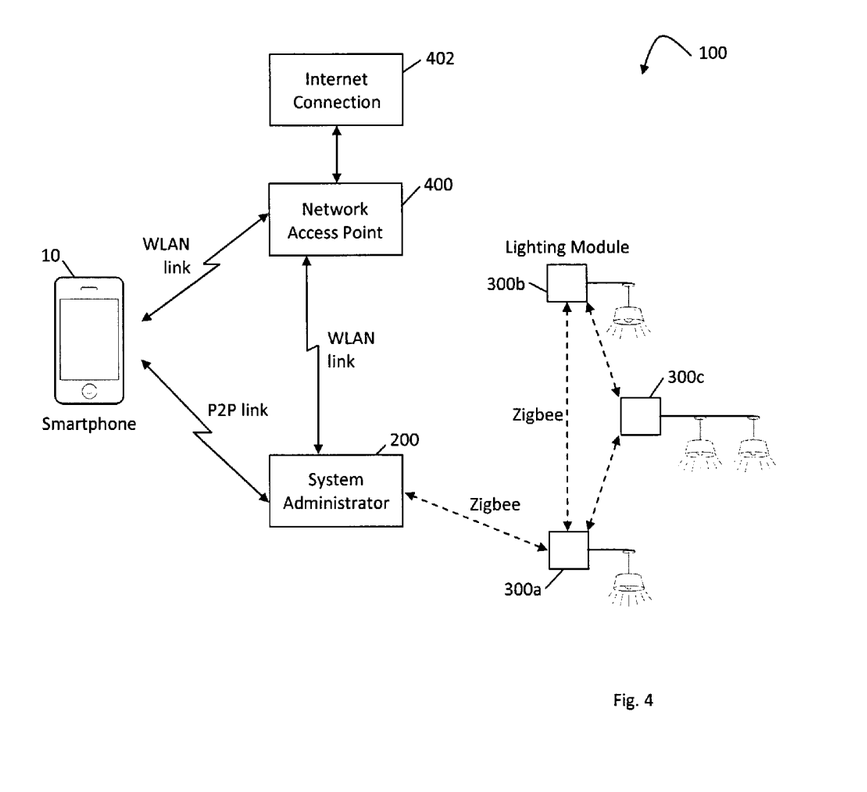
FIG. 4 is a system pictorial representation of the smartphone of FIG. 1 and its interaction with the system administrator of FIG. 2 and lighting module of FIG. 3.

FIG. 4 is a pictorial representation of system 100 showing an exemplary arrangement of smart phone 10, system administrator 200 and multiple lighting modules 300a, 300b, and 300c, and the communications systems connecting each of the elements. Wi-Fi WLAN has an access point 400. Access point 400 has Internet connection 402. The WLAN communications preferably pass through access point 400. Where system administrator 200 is configured as a network Wi-Fi device, it will preferably operate as a client of access point 400. For smartphone 10 to communicate with system administrator 200 running as a network Wi-Fi device, smartphone 10 is also preferably connected to access point 400 as a client. Messages from smartphone 10 then pass through access point 400 to system administrator 200. If smartphone 10 were not in wireless range of access point 400, it may still be able to communicate with access point 400 via internet connection 402 if so configured. The communications between a smartphone and an access point through an Internet connection would be well understood by those of ordinary skill in the art.

In addition to, or instead of, operating as a network Wi-Fi device, system administrator 200 may be configured as a Wi-Fi Direct access point/group participant. In that instance, smartphone 10 can wirelessly connect directly to system administrator 200 peer-to-peer without requiring any other device. Accordingly, it can be seen that: (1) access point 400 is not required for peer-to-peer communications; (2) the communications link may be formed on an "as needed" basis; and (3) that smartphone 10 needs to be within radio range of system administrator 200 to establish a direct communications link.

It can be appreciated that a network Wi-Fi connection and a Wi-Fi Direct access point/group participant connection offer a different mix of convenience and security. A system administrator operating as a network Wi-Fi device may be remotely controlled by a smartphone where the access point has an internet connection, however the system administrator then becomes exposed to the outside world and may be vulnerable to external threats such as hacking. Alternatively, a Wi-Fi Direct connection by virtue of its limited wireless range and peer-to-peer architecture offers a higher level of security. The balance between operational modes is usually subjective and dependant on the application at hand. In some instances infrastructure limitations such as the availability of a WLAN may further constrain operational modes.

In one preferred embodiment, the Product App preferably allows the user to configure system administrator 200 as a Wi-Fi Direct access point/group participant, network Wi-Fi device, or concurrent operation of both to best suit the user's application and personal preference.

Referring again to FIG. 4, system administrator 200 preferably communicates with lighting modules 300a, 300b, and 300c wirelessly using Zigbee. Zigbee is a wireless mesh networking standard, such that communications between system administrator 200 and any lighting module are routed throughout the mesh network, passing through intermediate devices on the way to the recipient. By way of example only, system administrator 200 wishing to send command data to lighting module 300b need only be able to communicate with one lighting module (e.g., lighting module 300a) in the Zigbee mesh network and not directly with lighting module 300b peer-to-peer. In FIG. 4, system administrator 200 is shown having an active Zigbee communication link with lighting module 300a. Commands from system administrator to lighting module 300b pass through lighting module 300a where they are propagated onto the mesh network. Depending on the mesh topology, commands may pass through lighting module 300c to lighting module 300b, or may pass directly from lighting module 300a to lighting module 300b. The protocols and operation of Zigbee wireless mesh networks are standards and specifications determined by the Zigbee Alliance and are know by those of ordinary skill in the art.

It can be appreciated that Zigbee wireless mesh networks offer a very powerful means for controlling devices over a wide physical area, however smartphones do not include native Zigbee communication capabilities and cannot therefore interface directly with a Zigbee wireless mesh network. In order for Product App running on smartphone 10 to send control data to a lighting module, it would preferably send the necessary commands to system administrator 200 either peer-to-peer or via WLAN depending on the chosen configuration of the system administrator. System microcontroller 208 would preferably receive control data from the Product App, perform any necessary processing and transmit commands via its Zigbee communications capabilities onto the Zigbee mesh created by the lighting modules for execution of the commands by the recipient lighting module/s. System administrator 200 may perform any computational tasks necessary to ensure commands from the Product App are transposed onto the Zigbee wireless mesh network in a format necessary for a lighting module to execute a function as intended by the user. For use with lighting, the system administrator preferably incorporates the Zigbee Light Link standard and utilises the specified command protocols for control of lighting module functions.

The Product App running on smartphone 10 preferably allows lighting modules to be named and grouped for convenience in the Product App, preferably allowing a single command from the Product App to control a designated group of lighting modules simultaneously. By way of example only, a user may create a group called "Lounge Room" from four lighting modules installed in a lounge room of a typical house. The user may through the Product App choose to turn off the Lounge Room group of lights, the Product App preferably sending commands to the designated group of four lighting modules to execute the chosen off command. Persons of ordinary skill in the art of network and control will understand that grouping methods and parameters can be stored in the Product App, system administrator 200 and/or lighting module 300 without departing from the scope of the present invention.

It is contemplated and within the scope of the invention that additional lighting modules may be added to the overall system as desired. One of the requirements with mesh technologies is that new mesh nodes typically need to be located close to an authoring device in order for the mesh node to be configured with the necessary parameters to join the network. System administrator 200 is preferably able to author new lighting modules as nodes of its Zigbee wireless mesh network. System administrator 200 preferably offers an integrated power receptacle 212 (FIG. 2) compatible with the power input connections of a lighting module, allowing a lighting module to plug into and accept power from system administrator 200 for the purpose of running its microprocessor and wireless communications systems to communicate with the system administrator and accept input of parameters for authoring onto the system administrator's Zigbee wireless mesh network. The Product App is preferably configured to manage the authoring of a new lighting module. The Product App is preferably used to put system administrator 200 into authoring mode allowing it to search for new lighting modules and load the necessary parameters into a new lighting module so that it can join the system administrator's mesh network as a node.

The process of authoring a device onto a Zigbee network would be well understood by those of ordinary skill in the art. Preferably, system administrator 200 has a means of powering the lighting module ensuring a close proximity of devices for the purpose of authoring. After a lighting module has been authored, all of the parameters for the system administrator's mesh network will be stored in lighting module's non-volatile memory. The lighting module can then be unplugged from the system administrator and physically installed at its required location. When powered up again, the lighting module with join the system administrator's mesh network using the parameters saved in its non-volatile memory.

Preferably, plugging lighting module 300 into power output 212 of system administrator 200 causes system administrator 200 and lighting module 300 to automatically commence authoring. Authoring may be accomplished on site or prior to shipping from the manufacturer if shipped as a collection of a system administrator and one or more lighting modules.

In one preferred embodiment, system administrator 200 may wirelessly author lighting module 300 as a mesh node in situ as long as lighting module 300 is powered and within wireless range of mesh network or system administrator 200.

It will be appreciated that the steps described above may be performed in a different order, varied, or certain steps added or omitted entirely without departing from the scope of the present invention. It will also be appreciated by those of ordinary skill in the art that the system described above can be varied in many ways without departing from the scope of the present invention.

What is claimed is:

1. A system for controlling a light in a residential or commercial location through a wireless communications link with a personal controller, the personal controller having a processor, a user interface, and a wireless communications transceiver, said system comprising:
at least one lighting module, said lighting module including a microcontroller and a wireless communications control module having an aerial and a radio transceiver, said lighting module being configured to vary power to the light connected to said lighting module; and
a system administrator device including a microcontroller and a wireless communications module operable for wireless communication with the personal controller and with said lighting module, said wireless communications module including circuitry configured to communicate with the personal controller with a peer-to-peer communications link, said circuitry being configured to communicate with said lighting module with a wireless network communications link, said microcontroller of said system administrator device being configured to operate said wireless communications module of said system administrator device in more than one mode, said microcontroller of said system administrator device being configured to operate said wireless communications module of said system administrator device in a first mode with the peer-to-peer communications link, said microcontroller of said system administrator device being configured to operate said wireless communications module of said system administrator device in a second mode with a non-peer-to-peer communications link, said microcontroller of said system administrator device being configured to change from the first mode to the second mode upon receiving instructions from the personal controller for said wireless communications module to operate in the second mode.

2. The system of claim 1, further comprising a ballast connected to said lighting module.

3. The system of claim 1, further comprising at least a second lighting module.

4. The system of claim 3, wherein wireless communications control modules of said lighting module and said second lighting module are configured to communicate with each other under a Zigbee communications protocol.

5. The system of claim 3, wherein wireless communications control modules of said lighting module and said second lighting module are configured to communicate with each other under a Zigbee Light Link communications protocol.

6. The system of claim 3, wherein said lighting module and said second lighting module are configured to form a mesh network.

7. The system of claim 3, wherein one of said lighting modules is configured for connection to an incandescent lamp, another of said lighting modules being configured for connection to a LED lamp.

8. The system of claim 1, wherein said wireless communications module of said system administrator device includes a first radio configured for peer-to-peer communication with the personal controller, a second radio configured for communication with said lighting module.

9. The system of claim 8, wherein said second radio is configured for communication with a mesh network.

10. The system of claim 8, wherein said second radio is configured for communication with said lighting module under a Zigbee communications protocol.

11. The system of claim 8, wherein said second radio is configured for communication with said lighting module under a Zigbee Light Link communications protocol.

12. The system of claim 8, further comprising a third radio configured for communication with a WLAN access point.

13. The system of claim 1, wherein said system administrator device is configured to plug into an electrical power source.

14. The system of claim 1, wherein said system administrator device includes a receptacle configured to engage said lighting module.

15. The system of claim 1, wherein said lighting module includes a plug configured to engage with said system administrator device.

16. The system of claim 1, wherein said circuitry of said wireless communications module of said system administrator device is configured to communicate with the personal controller under a Wi-Fi Direct communications protocol.

17. The device of claim 1, wherein said microcontroller of said system administrator device is configured to operate said wireless communications module in the first and second modes concurrently.

18. The device of claim 1, wherein said microcontroller of said system administrator device is configured to function as a network client device while operating in the second mode.

19. The system of claim 1, wherein said wireless communications module of said system administrator device is configured to open a peer-to-peer wireless communications link with the personal controller by simulating a Wi-Fi access point.

20. The system of claim 1, wherein said lighting module forms part of, or is built into a lighting ballast or LED luminaire.

21. The system of claim 1, where said microcontroller of said system administrator device is configured to remain operating in the first mode or change to a second mode upon receiving instructions from the personal controller for said wireless communications module to continue operating in the first mode or change to a second mode.

22. The system of claim 1, where said microcontroller of said system administrator device is configured to remain operating in the first mode or change to a second mode upon receiving instructions from the personal controller for said wireless communications module to continue operating in the first mode or change to a second mode, said microcontroller being further configured where the choice is made to continue operating in the first mode with user-definable parameters used for establishing future connections.

* * * * *